United States Patent
Cok et al.

(10) Patent No.: US 9,141,225 B2
(45) Date of Patent: Sep. 22, 2015

(54) CAPACITIVE TOUCH SCREEN WITH FORCE DETECTION

(71) Applicants: Ronald Steven Cok, Rochester, NY (US); Roger G. Markham, Webster, NY (US)

(72) Inventors: Ronald Steven Cok, Rochester, NY (US); Roger G. Markham, Webster, NY (US)

(73) Assignee: EASTMAN KODAK COMPANY, Rochester, NY (US)

( * ) Notice: Subject to any disclaimer, the term of this patent is extended or adjusted under 35 U.S.C. 154(b) by 85 days.

(21) Appl. No.: 13/906,506

(22) Filed: May 31, 2013

(65) Prior Publication Data

US 2014/0354585 A1  Dec. 4, 2014

(51) Int. Cl.
*G06F 3/041* (2006.01)
*G06F 3/044* (2006.01)

(52) U.S. Cl.
CPC .............. *G06F 3/0414* (2013.01); *G06F 3/044* (2013.01)

(58) Field of Classification Search
CPC ........................... G06F 3/0488; G06F 3/04883
USPC ................................................... 345/173, 179
See application file for complete search history.

(56) References Cited

U.S. PATENT DOCUMENTS

| | | | |
|---|---|---|---|
| 7,663,607 B2 | 2/2010 | Hotelling et al. | |
| 8,040,142 B1 | 10/2011 | Bokma et al. | |
| 2007/0046651 A1* | 3/2007 | Sinclair et al. | 345/173 |
| 2010/0225604 A1* | 9/2010 | Homma et al. | 345/173 |
| 2010/0244859 A1 | 9/2010 | Cormier, Jr. et al. | |
| 2011/0007011 A1 | 1/2011 | Mozdzyn | |
| 2011/0227872 A1 | 9/2011 | Huska et al. | |
| 2011/0248955 A1 | 10/2011 | Mo et al. | |
| 2011/0291966 A1 | 12/2011 | Takao et al. | |
| 2012/0043976 A1 | 2/2012 | Bokma et al. | |
| 2013/0082970 A1 | 4/2013 | Frey et al. | |
| 2014/0078070 A1* | 3/2014 | Armstrong-Muntner | 345/179 |

* cited by examiner

*Primary Examiner* — Kevin Nguyen
(74) *Attorney, Agent, or Firm* — Raymond L. Owens

(57) ABSTRACT

A capacitive touch-screen device with force detection of a deformable touch element includes drive and sense electrode arrays and a touch-detection circuit connected to the electrodes for detecting capacitance at a touch location. The touch-detection circuit senses no-touch capacitance, light-touch capacitance, and heavy-touch capacitance at the touch location in response to forcible deformation of the deformable touch element proximate to the touch. The touch-detection circuit reports a force signal.

25 Claims, 14 Drawing Sheets

CAPACITIVE TOUCH SCREEN WITH FORCE DETECTION

CROSS REFERENCE TO RELATED APPLICATION

Reference is made to commonly assigned, co-pending U.S. patent application Ser. No. 13/906,472 filed May 31, 2013 entitled "Force Detecting Method for Capacitive Touch Screen" by Ronald S. Cok and Roger G. Markham, the disclosure of which is incorporated herein.

FIELD OF THE INVENTION

The present invention relates to capacitive touch screens.

BACKGROUND OF THE INVENTION

Touch screens use a variety of technologies, including resistive, inductive, capacitive, acoustic, piezoelectric, and optical technologies. Such technologies and their application in combination with displays to provide interactive control of a processor and software programs are well known in the art. Capacitive touch-screens are of at least two different types: self-capacitive and mutual-capacitive. Self-capacitive touch-screens employ an array of transparent electrodes, each of which in combination with a touching device (e.g. a finger or conductive stylus) forms a temporary capacitor whose capacitance is detected. Mutual-capacitive touch-screens can employ an array of transparent electrode pairs that form capacitors whose capacitance is affected by a conductive touching device. In either case, each capacitor in the array is tested to detect a touch and the physical location of the touch-detecting electrode in the touch-screen corresponds to the location of the touch. For example, U.S. Pat. No. 7,663,607 discloses a multipoint touch-screen having a transparent capacitive sense medium configured to detect multiple touches or near touches that occur at the same time and at distinct locations in the plane of the touch panel and to produce distinct signals representative of the location of the touches on the plane of the touch panel for each of the multiple touches. The disclosure teaches both self- and mutual-capacitive touch-screens.

Referring to FIG. 10, a capacitive touch-screen device 5 includes a substrate 10. Substrate 10 is typically a dielectric material such as glass or plastic with two opposing flat and parallel sides. An array of drive electrodes 30 is formed on one side of substrate 10 and an array of sense electrodes 20 is formed on the other opposing side of substrate 10. Drive electrodes 30 extend in a drive electrode direction 32 and sense electrodes 20 extend in a sense electrode direction 22. The extent of the drive electrodes 30 and the sense electrodes 20 define a touch-detection area 70. Each location at which the drive electrode 30 and the sense electrode 20 overlap forms a capacitor at touch location 60 at which a touch is sensed; for example touch location 60 is shown in FIG. 6 as a projection from substrate 10 where drive electrode 30 and sense electrode 20 overlap. Thus, touch locations 60 form a two-dimensional array of capacitors corresponding to the locations at which drive electrodes 30 and sense electrodes 20 overlap. Alternatively, each location at which a drive electrode 30 is adjacent to the sense electrode 20 forms the touch location 60 at which a touch is sensed, for example in an embodiment in which drive electrodes 30 and sense electrodes 20 are formed in a common plane (not shown). Touch locations 60 can be associated with specific capacitor locations, as illustrated, or can be interpolated between capacitor locations. A cover 12 (not shown in FIG. 10) is located over substrate 10 to protect sense and drive electrodes 20, 30.

Each of drive electrodes 30 is connected by a wire 50 to a drive-electrode circuit 44 in a touch-detection circuit 40 such as a touch-screen controller. Likewise, each of sense electrodes 20 is connected by the wire 50 to a sense-electrode circuit 42 in touch-detection circuit 40. Under the control of a control circuit 46, drive-electrode circuit 44 provides current to drive electrodes 30, creating an electrical field.

Under the control of control circuit 46, a sense-electrode circuit 42 senses the capacitance of the electrical field at each sense electrode 20, for example by measuring the electrical field capacitance. In typical capacitive touch-screen devices 5, each drive electrode 30 is stimulated in turn and, while each drive electrode 30 is stimulated, the capacitance at each sense electrode 20 is measured, thus providing a measure of the capacitance at each touch location 60 where the drive electrode 30 overlaps the sense electrode 20. Thus, the capacitance is sensed at each touch location 60 in the array of touch locations 60. The capacitance at each touch location 60 is sensed periodically, for example ten times, one hundred times, or one thousand times per second. Changes or differences in the sensed capacitance at the touch location 60 indicate the presence of a touch, for example by a finger, at that touch location 60.

A variety of calibration and control techniques for capacitive touch screens are taught in the prior art. U.S. Patent Application Publication No. 2011/0248955 discloses a touch detection method and circuit for capacitive touch panels. The touch detection method for capacitive touch panels includes scanning the rows and columns of the capacitive matrix of a touch panel respectively, wherein during the scanning of the rows or columns of the capacitive matrix of the touch panel, two rows or columns are synchronously scanned at the same time to obtain the capacitance differential value between the two rows or columns, or one row or column is scanned at the same time to obtain the capacitance differential value between the row or column and a reference capacitance; and then processing the obtained capacitance differential value.

U.S. Patent Application Publication No. 2010/0244859 teaches a capacitance measuring system including analog-digital calibration circuitry that subtracts baseline capacitance measurements from touch-induced capacitance measurements to produce capacitance change values.

U.S. Pat. No. 8,040,142 discloses touch detection techniques for capacitive touch sense systems that include measuring a capacitance value of a capacitance sensor within a capacitance sense interface to produce a measured capacitance value. The measured capacitance value is analyzed to determine a baseline capacitance value for the capacitance sensor. The baseline capacitance value is updated based at least in part upon a weighted moving average of the measured capacitance value. The measured capacitance value is analyzed to determine whether the capacitance sensor was activated during a startup phase and to adjust the baseline capacitance value in response to determining that the capacitance sensor was activated during the startup phase.

U.S. Patent Application Publication No. 2012/0043976 teaches a technique for recognizing and rejecting false activation events related to a capacitance sense interface that includes measuring a capacitance value of a capacitance sense element. The measured capacitance value is analyzed to determine a baseline capacitance value for the capacitance sensor. The capacitance sense interface monitors a rate of change of the measured capacitance values and rejects an activation of the capacitance sense element as a non-touch event when the rate of change of the measured capacitance values have a magnitude greater than a threshold value, indicative of a maximum rate of change of a touch event.

Force sensing is also known in the art. U.S. Patent Application Publication 2011/0227872 discloses a touchpad with capacitive force sensing and can offer tactile feedback to a user's finger, providing a haptic device. This design detects the z (height) position of a finger as well as the x/y position (touch location). A pair of resistance planes are spaced-apart with a resistance mechanism (e.g. springs) to provide mechanical pressure to a finger. One or more force-sensing capacitive circuits are located under the touch surface. Touch location can be determined by the relative force provided by a touch to each of four corners of the touch area or by providing multiple capacitive sensors spatially distributed under the touch surface. Such a design requires the use of carefully controlled and calibrated springs and is thicker than desired.

U.S. Patent Application Publication 2013/0082970, the disclosure of which is incorporated by reference, discloses a positional touch sensor with force measurement. A force-sensing element is disposed with the transparent touch-sensing element and includes two spaced-apart parallel sets of micromesh bands separated by a layer of pressure-responsive material between the micromesh bands forming force-sensing elements. By applying force to the micromesh bands and the pressure-response material and electronically monitoring the force-sensing elements, the allocation and amount of force can be measured. However, such a design requires additional layers of material, reducing transparency and increasing thickness of the touch-sensing device.

Touch-screens, including very fine patterns of conductive elements, such as metal wires or conductive traces are known. For example, U.S. Patent Publication No. 2011/0007011 teaches a capacitive touch screen with a mesh electrode, as does U.S. Patent Publication No. 2010/0026664. U.S. Patent Application Publication No. 2011/0291966 discloses an array of diamond-shaped micro-wire structures.

Although a variety of capacitive touch-and-force-sensing devices are known, there remains a need for further improvements in transparency and thickness.

SUMMARY OF THE INVENTION

A capacitive touch-screen device with force detection of a deformable touch element comprises:

a first array of drive electrodes and a second array of sense electrodes in association with a touch-detection area; and a touch-detection circuit connected to the drive electrodes and connected to the sense electrodes for detecting capacitance at a touch location in the touch-detection area, the touch-detection circuit for:

sensing no-touch capacitance with the touch-detection circuit at the touch location in the absence of the deformable touch element proximate to the touch location and reporting a no-touch signal;

sensing light-touch capacitance different from the no-touch capacitance with the touch-detection circuit at the touch location in the presence of a light-touch deformation of the deformable touch element proximate to the touch location and reporting a light-touch signal; and sensing heavy-touch capacitance different from both the no-touch capacitance and the light-touch capacitance with the touch-detection circuit at the touch location in the presence of a heavy-touch deformation of the deformable touch element proximate to the touch location and reporting a heavy-touch signal.

The present invention provides a device and method for force sensing in a capacitive touch screen device. The capacitive touch screen device has improved transparency and thickness.

BRIEF DESCRIPTION OF THE DRAWINGS

The above and other features and advantages of the present invention will become more apparent when taken in conjunction with the following description and drawings wherein identical reference numerals have been used to designate identical features that are common to the figures, and wherein:

FIGS. 11-14 are illustrative arrays of sensed values useful in understanding the present invention.

DETAILED DESCRIPTION OF THE INVENTION

Figure 1:
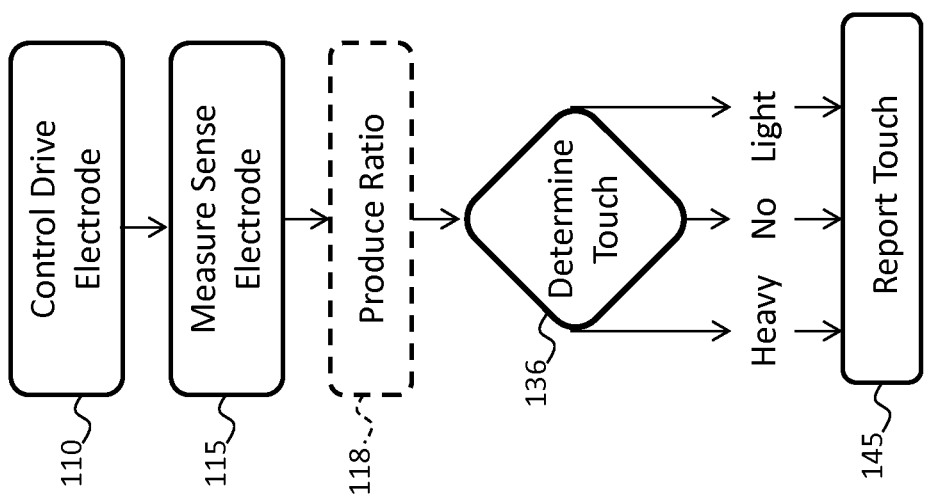
FIGS. 1-4 are flow diagrams illustrating various embodiments of the present invention.

The present invention provides a device and method for sensing force applied to a capacitive touch screen with a deformable touch element. As shown in the prior-art illustration of FIG. 10, the capacitive touch screen device 5 is a touch screen that senses the presence of a touch element at the touch location 60 in the touch-detection area 70 defined by the extent of sense and drive electrodes 20, 30. Drive electrodes 30 extend across touch-detection area 70 in a drive-electrode direction 32 and sense electrodes 20 extend across the touch-detection area in a sense-electrode direction 22 direction different from drive-electrode direction 32 to define the extent of touch-detection area 70. Touch locations 60 are defined where sense electrodes 20 and drive electrodes 30 overlap. A deformable touch element is deformed in response to a force applied to the deformable touch element, for example mechanical pressure. According to embodiments of the present invention, the force with which a deformable touch element presses against a capacitive touch screen is determined by sensing the capacitive values at touch locations 60 and the capacitive value distribution over the touch-detection area 70. In an embodiment, a deformable touch element is a finger. Force can be relative or absolute.

A deformable touch element is a physical object that is sufficiently conductive to affect the sensed capacitance at the touch location 60 in a capacitive touch screen and that deforms when it is pressed against a surface, for example the surface of a capacitive touch screen cover or substrate or a display cover or substrate. The shape of the deformable touch element changes in response to mechanical pressure.

Figure 5:
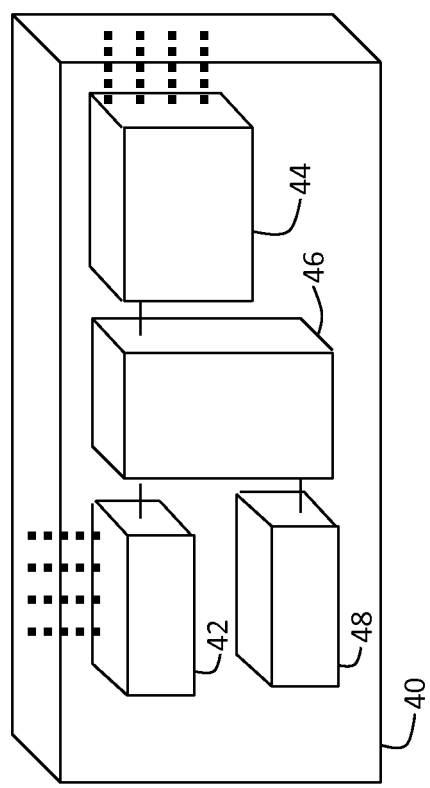
FIG. 5 is a perspective illustration of circuits useful for embodiments of the present invention.
Figure 8:
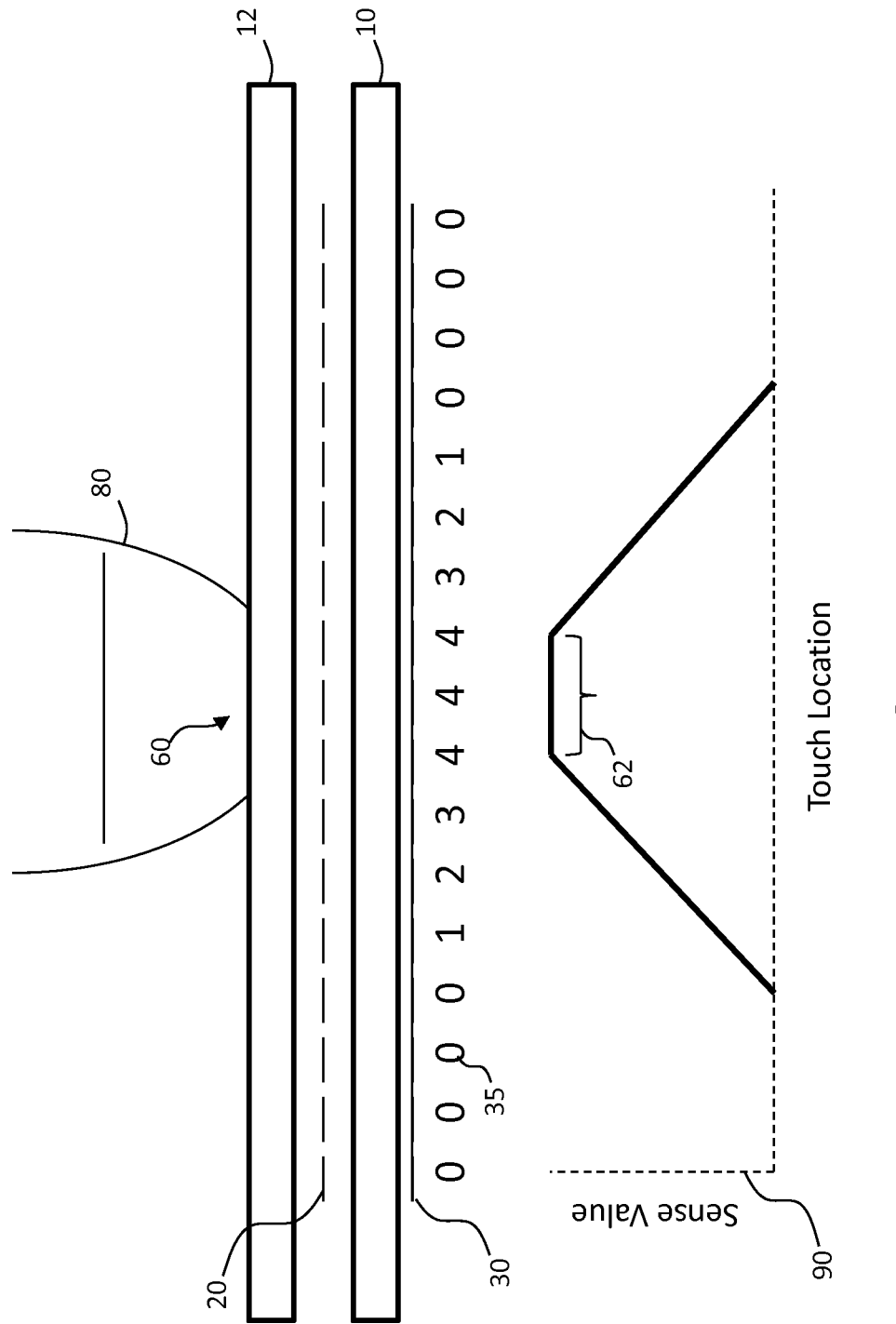
FIG. 8 is an exploded, illustrative cross section of an embodiment of the present invention including notations and a graph for sensed values for a medium-touch signal.
Figure 9:
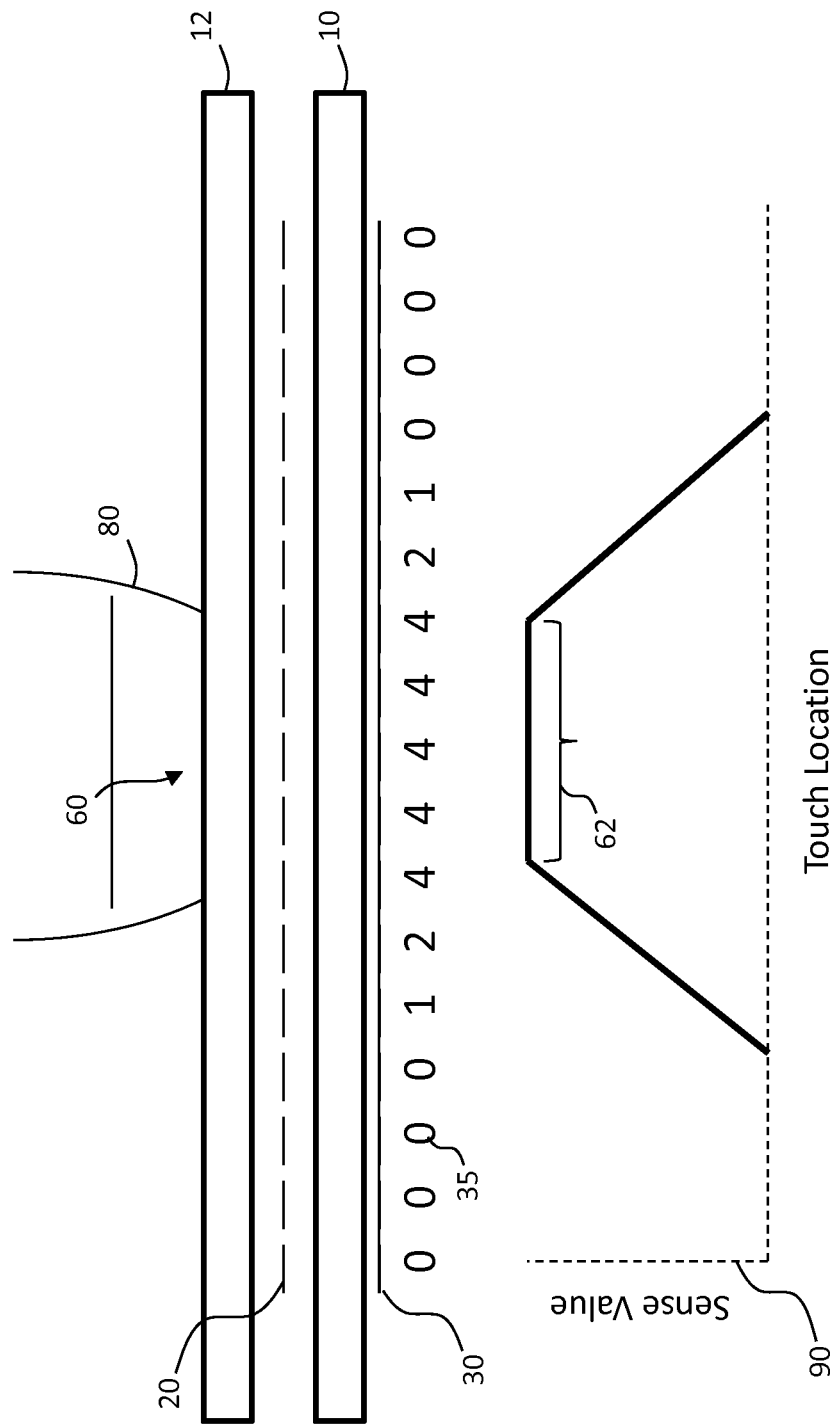
FIG. 9 is an exploded, illustrative cross section of an embodiment of the present invention including notations and a graph for sensed values for a heavy-touch signal.
Figure 10:
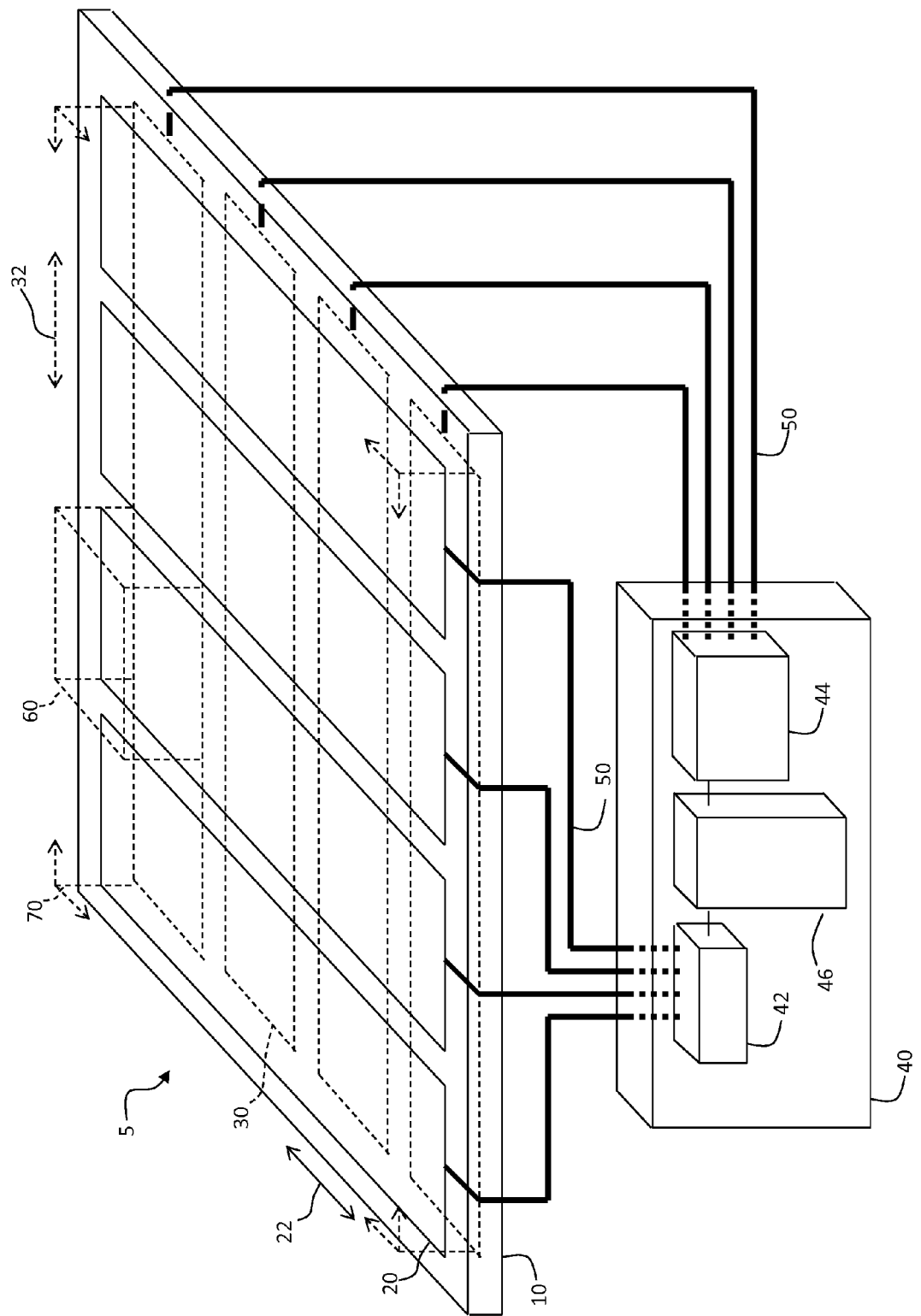
FIG. 10 is an illustration of a prior-art capacitive touch screen device.

Referring first to FIGS. 1, 5, and 10, and with reference to FIGS. 6-9, in an embodiment of the present invention, a method for force detection of a deformable touch element with a capacitive touch-screen device includes providing a first array of drive electrodes 30 and a second array of sense electrodes 20 in association with the touch-detection area 70, for example on either side of substrate 10 protected by cover 12. Touch-detection circuit 40 is connected to drive electrodes 30 and connected to sense electrodes 20 for detecting capacitance at touch location 60 in touch-detection area 70.

Control circuit 46 controls Step 110 drive-electrode circuit 44 to provide current through wires 50 to drive electrodes 30 at a suitable voltage and frequency. At the same time, control circuit 46 measures Step 115 capacitance of sense electrodes 20 through wires 50 and sense-electrode circuit 42. The sensed capacitance is analyzed, for example with a calculation circuit 48, to determine Step 136 the force and location of any touch, for example a no touch, a light touch, a medium touch, or a heavy touch. The touch determination is then reported Step 145.

Capacitive touch structures such as those illustrated in FIGS. 6-10 are known in the prior art, for example in the display and touch screen industries. Control circuits 46, drive-electrode circuits 44, and sense-electrode circuits 42 are also known in the art and are made with conventional electronic circuits. Digital and analog circuits are also known that are suitable for calculation circuit 48, for example digital logic circuits, stored program machines, and gate arrays.

Referring to FIG. 5, in an embodiment of the present invention, touch-detection circuit 40 includes drive-electrode circuit 44 for providing electrical signals to drive electrodes 30 through wires 50, sense-electrode circuit 42 for sensing electrical signals from sense electrodes 30 through wires 50, and control circuit 46 for controlling drive-electrode circuit 44 and sense-electrode circuit 42. Touch-detection circuit 40 also includes calculation circuit 48. Calculation circuit 48 calculates values related to drive signals and sensed signals to determine force associated with touches on the capacitive touch screen.

FIGS. 6-9 are idealized illustrations of a capacitive touch screen having substrate 10 with drive electrodes 30 on one side of substrate 10 and sense electrodes 20 on the opposing side of substrate 10 defining touch-detection area 70. Cover 12 protects the capacitive touch screen from a deformable touch element 80 at touch location 60. A sense value 35 located beneath each sense electrode 20 provides an idealized measured sense value 35 for the corresponding sense electrode 20. A graph 90 graphs the sense value 35 at each sense electrode location 20.

Figure 6:
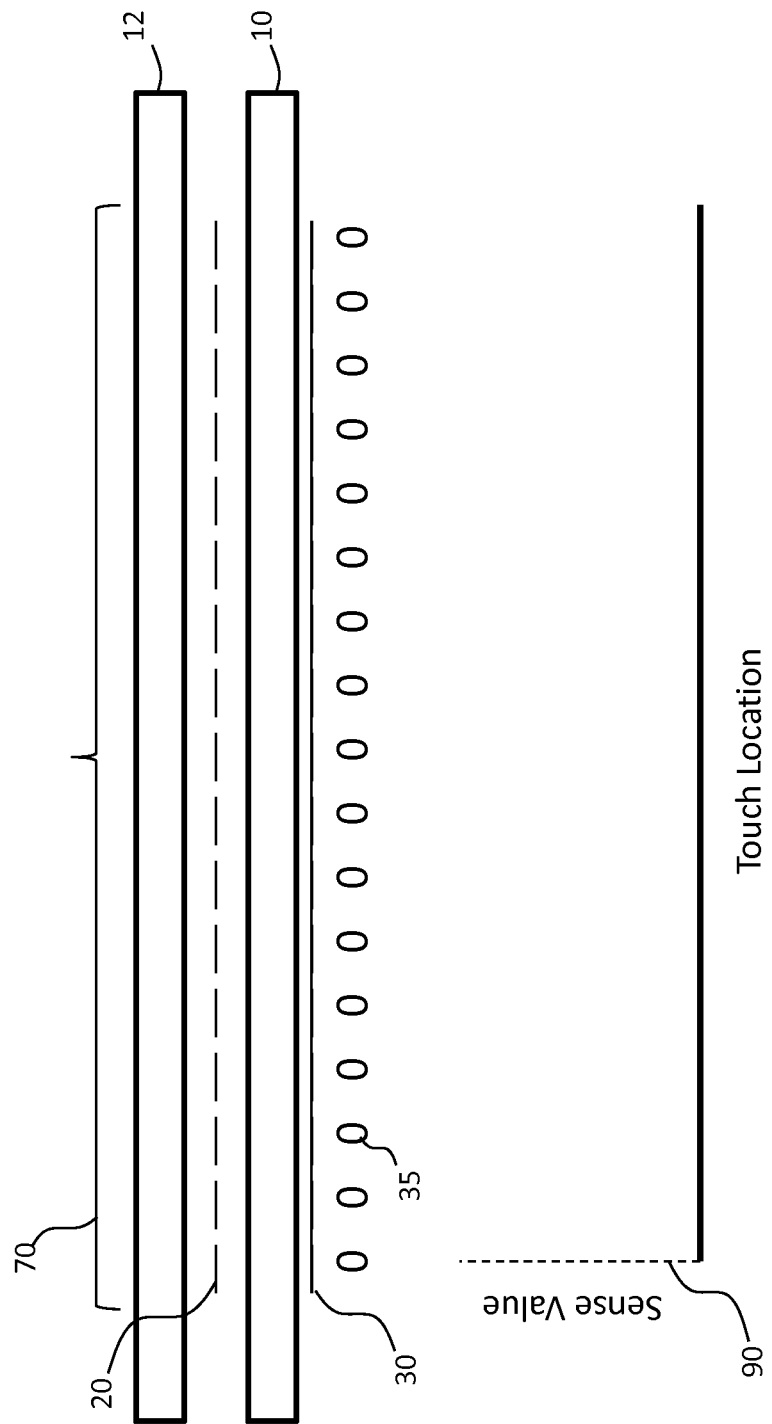
FIG. 6 is an exploded, illustrative cross section of an embodiment of the present invention including notations and a graph for sensed values for a no-touch signal.
Figure 7:
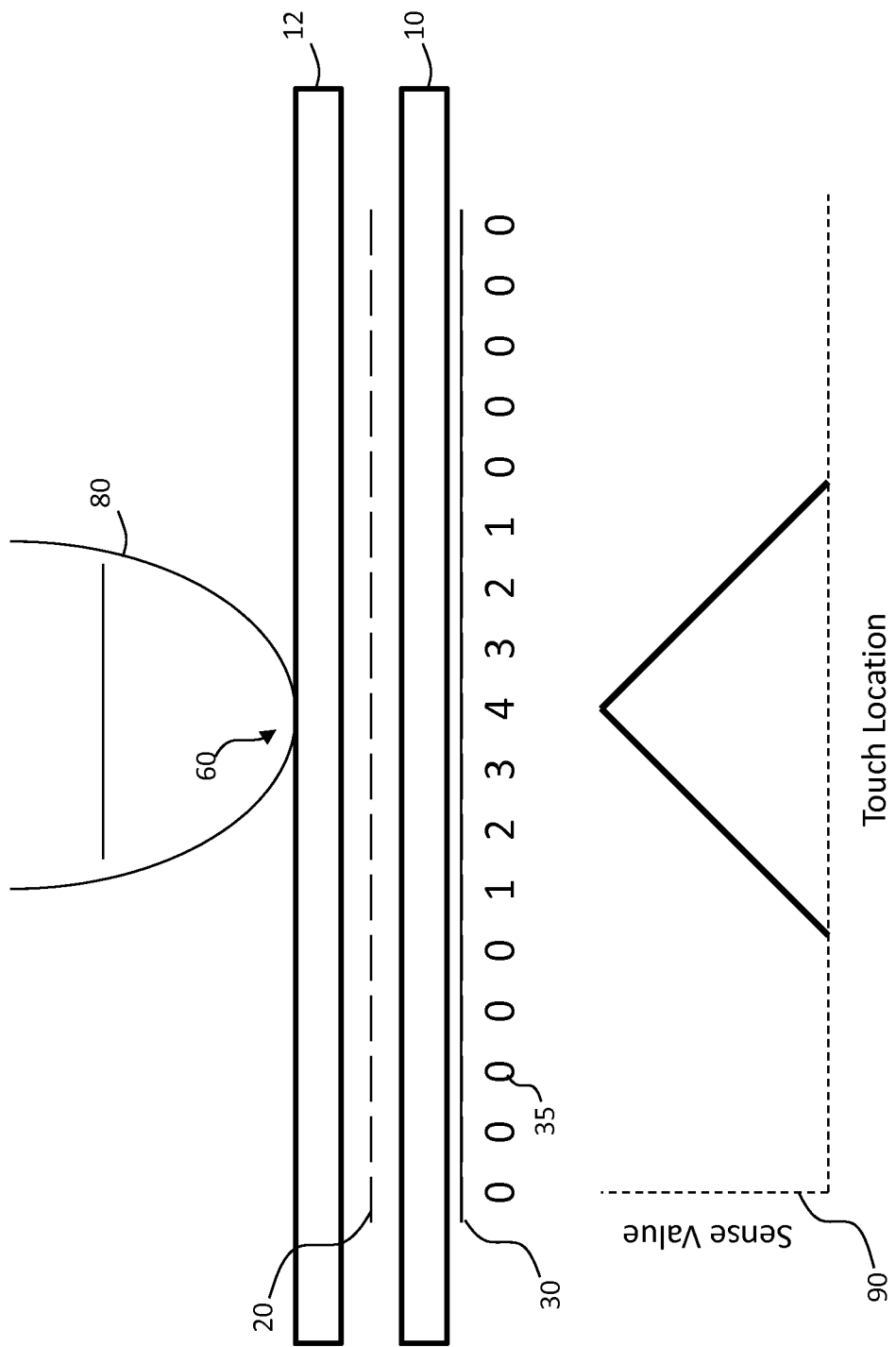
FIG. 7 is an exploded, illustrative cross section of an embodiment of the present invention including notations and a graph for sensed values for a light-touch signal.

Referring specifically to FIG. 6, in the absence of a deformable touch element 80 (FIG. 7) proximate to touch location 60, no-touch capacitance is sensed Step 115 and determined Step 136 with touch-detection circuit 40 in touch-detection area 70 and reported Step 141. Referring specifically to FIG. 7, in the presence of a light-touch deformation of deformable touch element 80 proximate to touch location 60, light-touch capacitance different from the no-touch capacitance is sensed Step 115 and determined Step 136 with touch-detection circuit 40 at touch location 60 and reported Step 141. Referring specifically to FIG. 8, in the presence of a medium-touch deformation of deformable touch element 80 proximate to touch location 60, medium-touch capacitance different from the no-touch capacitance is sensed Step 115 and determined Step 136 with touch-detection circuit 40 at touch location 60 and reported Step 141. Referring specifically to FIG. 9, in the presence of a heavy-touch deformation of deformable touch element 80 proximate to touch location 60, heavy-touch capacitance different from the no-touch capacitance is sensed Step 115 and determined Step 136 with touch-detection circuit 40 at touch location 60 and reported Step 141.

Light, medium, and heavy are used herein to describe relative amounts of force or deformation of deformable touch element 80, where "no" refers to no force and no deformation of deformable touch element 80, "light" refers to more force and deformation of deformable touch element 80 than "no", "medium" refers to more force and deformation of deformable touch element 80 than "light", and "heavy" refers to more force and deformation of deformable touch element 80 than "medium". By "proximate" is meant that the deformable touch element 80 is close enough to the touch location for a signal to be detected by the touch-detection circuit 40. FIG. 6 illustrates no touch and the absence of deformable touch element 80. FIG. 7 illustrates a light touch and a light deformation of deformable touch element 80. FIG. 8 illustrates a medium touch and a medium deformation of deformable touch element 80. FIG. 9 illustrates a heavy touch and a heavy deformation of deformable touch element 80. According to embodiments of the present invention, other amounts of force and deformation of deformable touch element 80 are sensed and reported. In one embodiment, a continuous range of forces and deformations are sensed and reported from no touch to a desired or measured maximum force and deformation.

Referring to FIG. 6, deformable touch element 80 is absent and therefore there is no detectable touch signal indicated by sense values 35 equal to zero. Referring to FIG. 7, deformable touch element 80 touches cover 12 at touch location 60, deforming deformable touch element 80 with a light-touch deformation and providing sense values 35 as indicated, with a maximum value of 4 and smaller sense values 35 on either side of touch location 60. The light-touch deformation can be very small. Referring to FIG. 8, deformable touch element 80 touches cover 12 at touch location 60 with greater force, deforming deformable touch element 80 with a medium-touch deformation greater than the light-touch deformation and providing sense values 35 as indicated, with a maximum value of 4 and smaller sense values 35 on either side of touch location 60. Under medium-touch deformation, deformable touch element 80 provides a greater number of sense values 35 equal to the greatest differential sense value 35 than when under light-touch deformation, represented on graph 90 as a calculated touch area 62 for medium force. Under heavy-touch deformation, deformable touch element 80 provides a greater number of sense values 35 equal to the greatest differential sense value 35 than when under medium-touch deformation, represented on graph 90 as the calculated touch area 62 for heavy force. Touch area 62 for heavy force is greater than touch area 62 for medium force.

Sense values 35 can represent absolute values, for example capacitance measurements, or ratios between the measured capacitance value and a sensed no-touch value. Alternatively, sense values 35 can be calculated from measured values or from calculated ratios. Sense values 35 can be a difference between a baseline measurement, for example where no deformable touch element 80 is present, and a measured value. A measured capacitance value can be larger or smaller when a capacitance is measured in the presence of deformable touch element 80 than a corresponding capacitance value measured when no deformable touch element 80 is present. In the examples below, the capacitance measured in the presence of deformable touch element 80 is smaller than a corresponding capacitance value measured when no deformable touch element 80 is present. However, differences between capacitances measured in the presence of deformable touch element 80 and capacitances measured when no deformable touch element 80 is present are described, for convenience, as positive values and the greatest sense value 35 is typically the greatest difference value. These arithmetic conventions are arbitrary; different and equivalent computations are readily understood by those skilled in mathematics and are included as embodiments of the present invention.

Since a capacitance value for the touch location 60 can vary depending on environmental factors, sense ratios or values derived from sense ratios can provide a value with reduced noise and improved accuracy. Sensed values can be measured values, for example measured capacitance values, either calibrated or uncalibrated.

A series of uncalibrated capacitance measurements were made at the touch location 60 on a capacitive touch screen with a finger at three different force levels and are recorded in Table 1 together with the ratio of each measurement with respect to the no-touch sense value 35. Alternatively, a value produced from the sensed value or a value produced from the ratio is used to distinguish different levels of force.

TABLE 1

|       | No-touch | Light-touch | Medium-touch | Heavy-touch |
|-------|----------|-------------|--------------|-------------|
|       | 162      | 148         | 142          | 141         |
| Ratio | 1.0      | 0.91        | 0.88         | 0.87        |

The ratio is the measured value divided by the no-touch measured value.

The results recorded in Table 1 demonstrate that capacitive measurements made with deformable touch element 80 are useful in determining the force with which deformable touch element 80 is pressed against a capacitive touch screen. As illustrated in FIG. 1, a touch signal is reported in response to either an absolute measured capacitive value or a ratio calculated with calculating circuit 48 and produced in Step 118. Thus, if the no-touch sense value 35 is measured or a no-touch ratio calculated, a no-touch signal is reported. If a light-touch ratio or light-touch sense value 35 is measured, a light-touch signal is reported. If a medium-touch ratio or medium-touch sense value 35 is measured, a medium-touch signal is reported. If a heavy-touch ratio or heavy-touch sense value 35 is measured, a heavy-touch signal is reported. As measured, the light-touch ratio is closer to one than the medium-touch ratio and the medium-touch ratio is closer to one than the heavy-touch ratio. In an embodiment, ratios are inverted so that they are greater than one rather than less than one.

Figure 2:
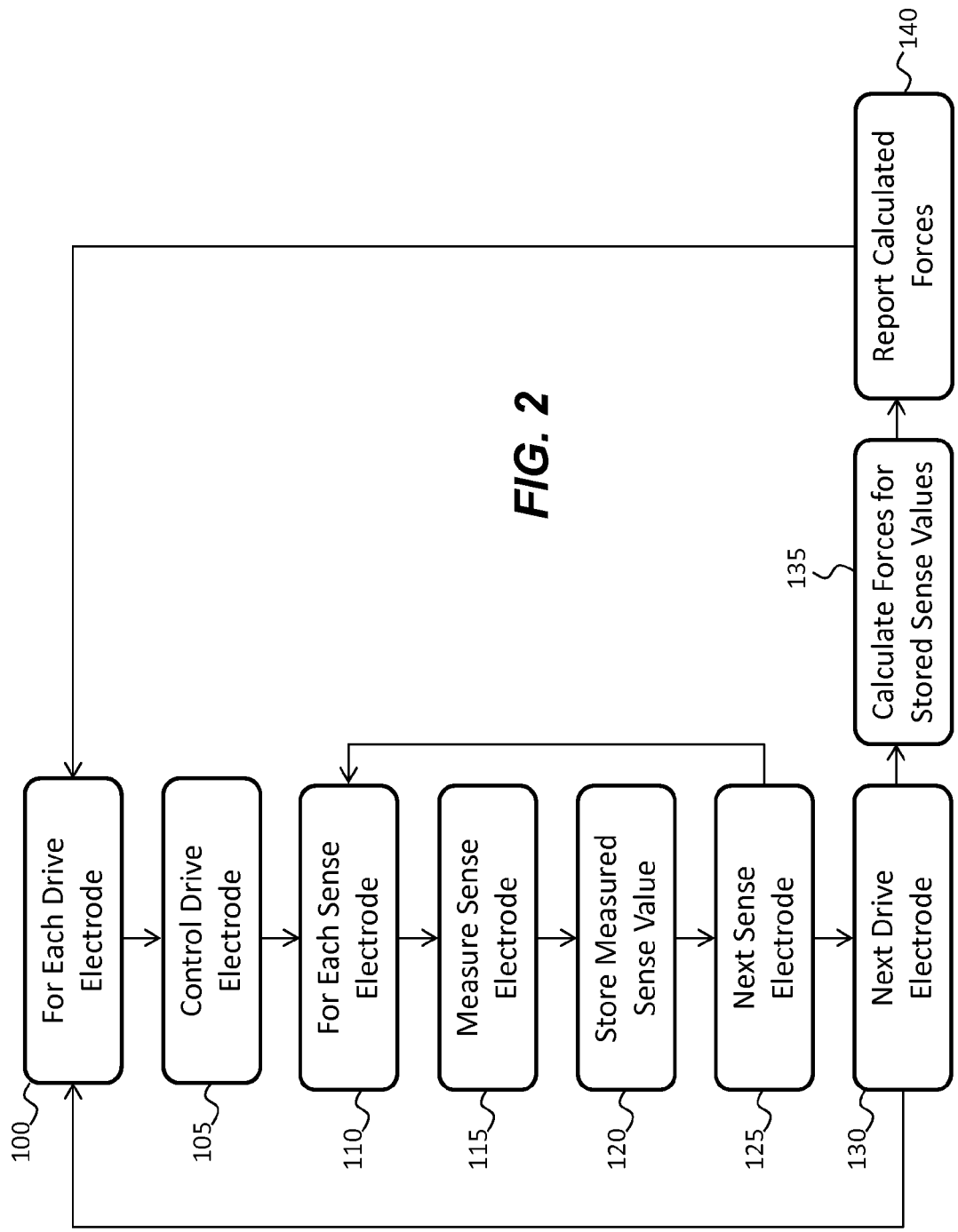

Referring to FIG. 2, for each drive electrode 30 in Step 100 touch-detection circuit 40 controls drive-electrode circuit 44 in Step 105 to provide electrical signals to drive electrodes 30. For each sense electrode 20 in Step 110, touch-detection circuit 40 controls sense-electrode circuit 42 in Step 110 to measure electrical signals from sense electrodes 20 in Step 115. The measured sense values 35 are stored 120, for example in a digital memory, and the next sense electrode is controlled in Step 125. When the capacitance of each sense electrodes 20 has been measured, the next drive electrode 30 is electrically controlled in Step 130. Thus, by controlling each drive electrode 30 in turn and measuring the capacitance with each sense electrode 20, the capacitance of each touch location 60 in an array of touch locations 60 in touch-detection area 70 is measured. The forces for each stored sense value 35 is calculated with calculation circuitry 48 in Step 135 and reported in Step 140. By sensing the capacitance at each touch location 60, the touch location 60 for deformable touch element 80 is determined and reported together with the corresponding force. In an embodiment, the process described in FIG. 2 is periodically repeated, for example with a frequency greater than once per second, greater than 10 times per second, greater than 100 times per second, or greater than 1,000 times per second. In an alternative embodiment, force calculation (Step 135) is done within the loop and a calculated force value is stored rather than the measured sense value 35 (in Step 120).

As illustrated in FIGS. 7-9, deformable touch element 80 is increasingly deformed as force is increased. In an embodiment, when deformable touch element 80 deforms, the average distance between deformable touch element 80 and drive or sense electrodes 20, 30 is smaller for a heavy-touch deformation than for a light-touch deformation. Thus, as force increases, deformable touch element 80 becomes closer to drive or sense electrodes 20, 30 and thereby increases the difference between the measured sense value 35 and the no-touch sense value 35. In various embodiments, a surface or center of mass of deformable touch element 80 becomes closer to drive or sense electrodes 20, 30 as force increases.

Figure 3:
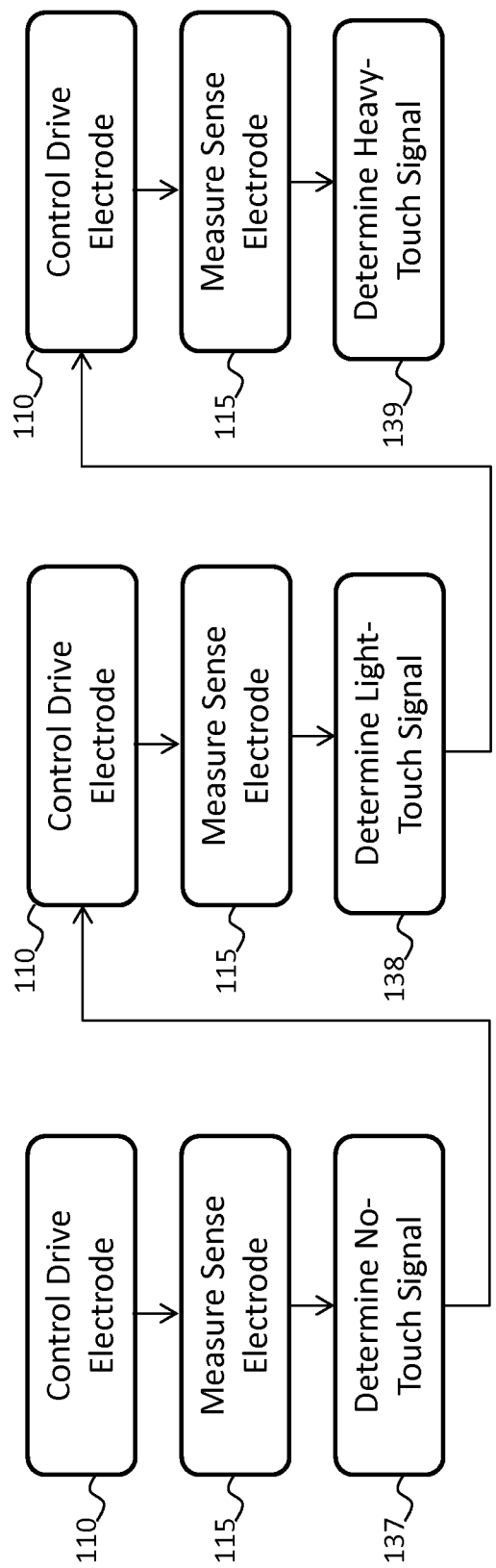

Referring to FIG. 3 in a first operational phase, the drive electrode 30 is controlled in Step 110 and sense electrode 20 is sensed in Step 115. A no-touch signal is determined in Step 137. In a second operational phase subsequent to the first operational phase, the drive electrode 30 is controlled in Step 110 and sense electrode 20 is sensed in Step 115. A light-touch signal is determined in Step 138. In a third operational phase subsequent to the second operational phase, the drive electrode 30 is controlled in Step 110 and sense electrode 20 is sensed in Step 115. A heavy-touch signal is determined in Step 139. Thus a progression of sensed values from no-touch, to light-touch, to heavy-touch is determined, corresponding to the physical experience of a user.

In typical use, a capacitive touch screen does not record a touch most of the time, especially when starting up. Thus, an initial touch signal is likely to be a no-touch signal. Therefore, a light-touch signal is likely to be recorded before a medium-touch signal and a medium-touch signal is likely to be recorded before a heavy-touch signal. Even if a user desires to immediately register a heavy touch, in the process of doing so, a user is likely to first press with a light touch, then with a medium tough, then with a heavy touch. A sequential series of progressively more forceful touches is recorded and signaled, especially if touch-detection circuit 40 is fast relative to human actions. Thus, in another embodiment, a light-touch capacitance is sensed at touch location 60 and then a heavy-touch capacitance is sensed at touch location 60. A heavy-touch signal is then reported at least partly in response to sensing the light-touch capacitance followed by sensing the heavy-touch capacitance. By first sensing a light or medium touch, the likelihood of a heavy touch is increased, thereby reducing false reporting of a heavy touch.

In a further embodiment of the present invention, an array of touch locations 60 is sensed to provide an array of measured sense values 35. In this embodiment, the first array of drive electrodes 30 and the second array of sense electrodes 20 are provided in association with a touch-detection area 70. The touch-detection circuit 40 connects drive electrodes 30 and sense electrodes 20 to detect capacitance at multiple touch locations 60 in touch-detection area 70.

Touch-detection circuit 40 senses no-touch capacitance at multiple touch locations 60 in the absence of deformable touch element 80 proximate to multiple touch locations 60 and reports a no-touch signal. Touch-detection circuit 40 senses light-touch capacitance different from the no-touch capacitance at multiple touch locations 60 in the presence of a light-touch deformation of deformable touch element 80 proximate to multiple touch locations 60 and reports a light-touch signal. Touch-detection circuit 40 senses medium-touch capacitance different from the no-touch capacitance and light-touch capacitance at multiple touch locations 60 in the presence of a medium-touch deformation of deformable touch element 80 proximate to multiple touch locations 60 and reports a medium-touch signal. Touch-detection circuit 40 senses heavy-touch capacitance different from the no-touch capacitance, the light-touch capacitance, and the medium-touch capacitance at multiple touch locations 60 in the presence of a heavy-touch deformation of deformable touch element 80 proximate to multiple touch locations 60 and reports a heavy-touch signal.

As illustrated with sense values 35 and graphs 90 of FIGS. 6-9, as deformable touch element 80 force increases, more sense values 35 are larger. As comparatively shown in FIGS. 8 and 9, a larger deformation of deformable touch element 80 results in more sense values 35 over a larger touch area 62 having larger measured or calculated sense values 35. Thus, a heavy-touch signal is reported at a first number of touch locations 60, a light-touch signal is reported at a second number of touch locations, and the first number is greater than the second number.

Figure 12:
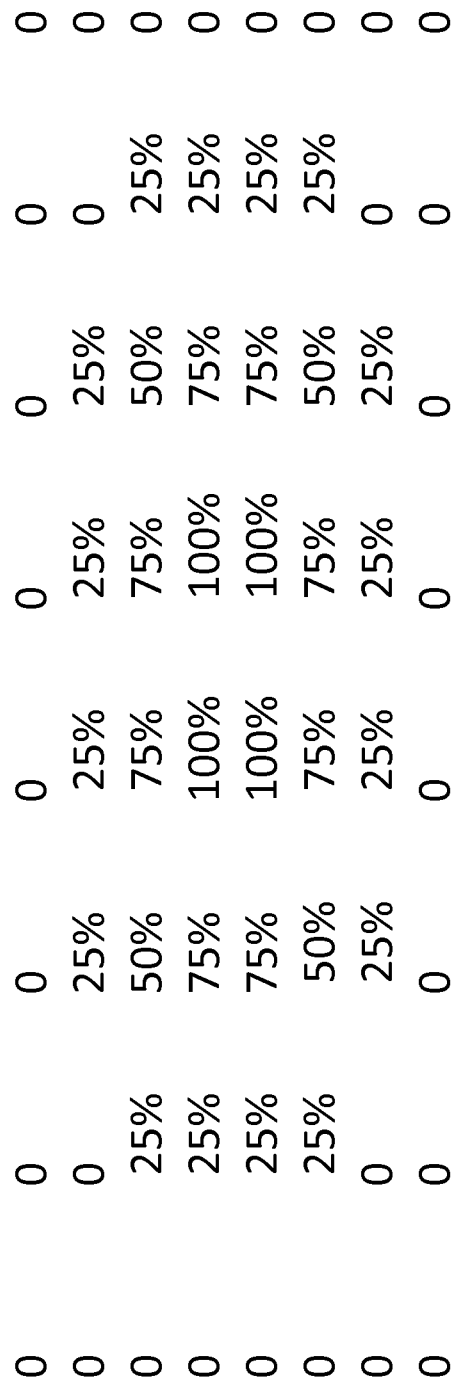
Figure 13:
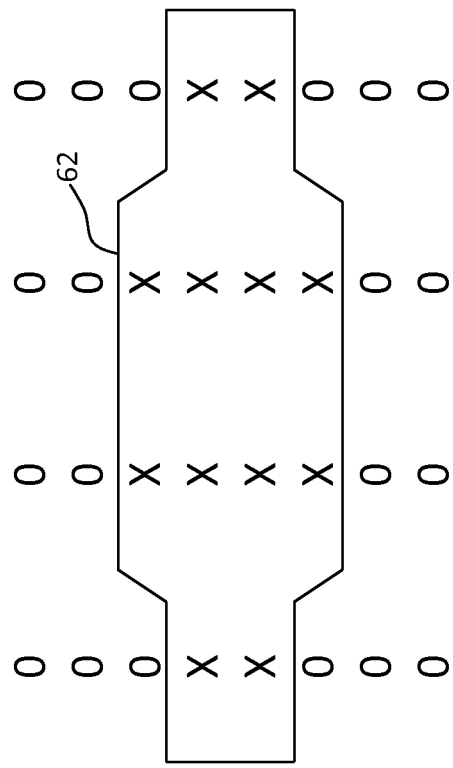

The illustrations of FIGS. 6-9 represent a one-dimensional array of sense values 35, for example measured along a single sense or drive electrode 20, 30. Referring to FIG. 11, in an alternative arrangement a two-dimensional arrangement of touch locations 60 results in a corresponding two-dimensional array of sense values 35. Sense values 35 that are equal to the maximum sense value 35, that are within a pre-determined absolute range of sense values 35, or that form a ratio with the no-touch sense value 35 within a pre-determined range of ratios form a set of values corresponding to touch locations 60 defining touch area 62 within touch-detection area 70. As shown in FIGS. 12 and 13, all values equal to the largest value or within 75% of the largest value (values 3 and 4) are included in touch area 62. Other algorithmic ways for determining touch location 60 membership in touch area 62 are also contemplated and included in the present invention.

Figure 4:
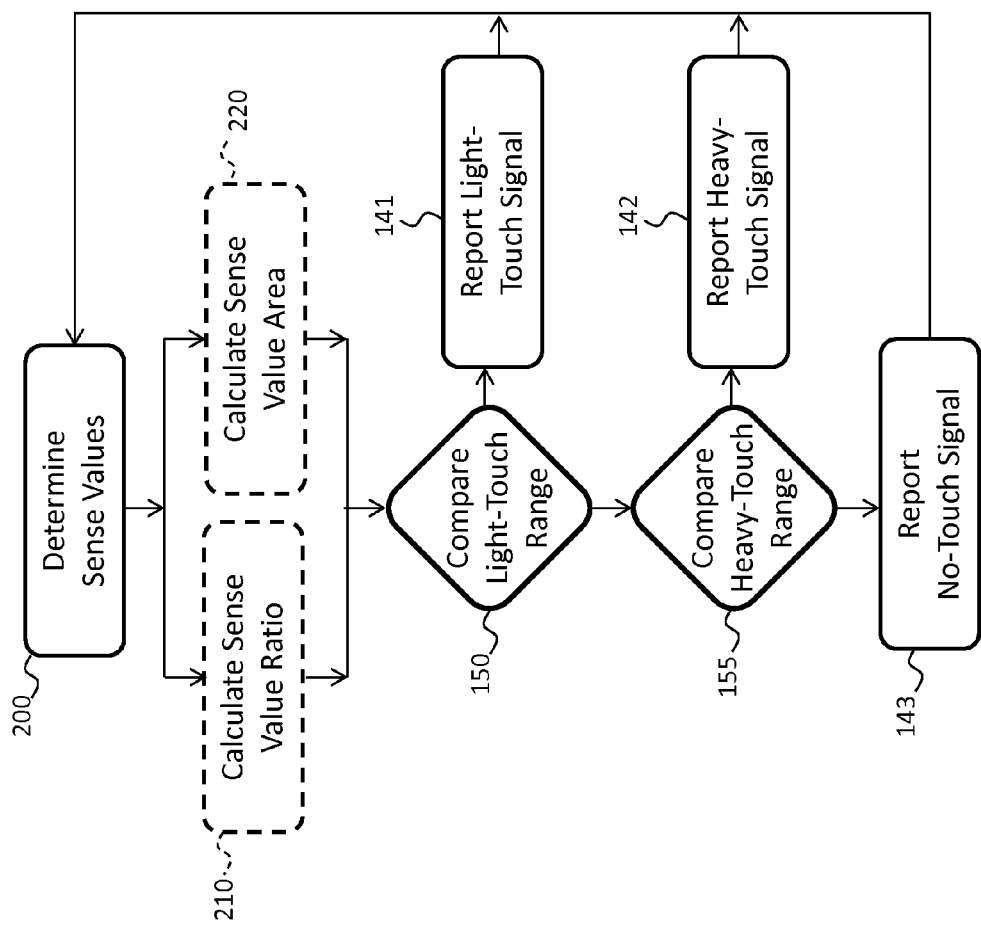

Referring to FIG. 4, a method of the present invention employing range values is illustrated in a flow diagram. The sense value 35 is first determined in Step 200 by driving drive electrodes 30 and sensing sense electrodes 20 as described above. Once sense values 35 are determined, a sense value ratio is calculated in Step 210 or a sense-value area is calculated in Step 220, or both. The calculated ratio or area is then compared to a series of ranges, for example pre-determined ranges corresponding to no-touch, light-touch, or heavy-touch. The order of comparison can be varied as will be appreciated by one skilled in signal processing programming. As illustrated, the calculated ratio or area is compared to a light-touch range of values in Step 150. If the calculated ratio or area is within the light-touch value range, a light-touch signal is reported in Step 141. If the calculated ratio or area is not within the light-touch value range, they are compared to a heavy-touch value range in Step 155. If the calculated ratio or area is within the heavy-touch value range, a heavy-touch signal is reported in Step 142. If the calculated ratio or area is not within the heavy-touch value range, a no-touch signal is reported in Step 143. The process is then iteratively repeated over time.

In the embodiments of FIGS. 11-13, touch locations 60 defining touch area 62 are adjacent and form a contiguous set. By adjacent is meant that no touch location 60 that is not within touch area 62 is between two touch locations 60 that are within touch area 62. In a further embodiment (FIG. 14), touch area 62 can be defined to include touch locations 60A that by themselves do not meet the criterion for membership in touch area 62 but are between touch locations 60B that do meet the criterion for membership in touch area 62.

As illustrated, touch area 62 for a medium-deformation touch (FIG. 8) is smaller than touch area 62 for a heavy deformation touch (FIG. 9). Thus, a more forceful touch can affect more touch locations than a less forceful touch.

In an embodiment, each of touch locations 60 reporting a heavy touch or reporting a light touch is adjacent to another touch location 60 reporting a heavy touch or reporting a light touch. Touch locations 60 reporting a heavy touch or reporting a light touch can form a two-dimensional array but more typically form a substantially circular, elliptical, or oval area. In actual practice, the perimeter often includes deformations and is not perfectly circular, oval, or elliptical. In a further embodiment, touch area 62 can be calculated from absolute sensed touch values or ratios. Algorithms such as a convex hull, known in the art, are used to determine touch area 62 in various embodiments.

In another embodiment, deformable touch element 80 has a center; the center can, but does not necessarily, correspond to touch location 60 when deformable touch element 80 is detected. As shown in FIGS. 7-9, sensed or calculated touch signals are typically greater nearer the center and smaller farther from the center. When a light touch is sensed as a difference between light-touch capacitance and no-touch capacitance, the sensed light touch is smaller for touch locations farther from the center and greater for touch locations closer to the center. Similarly, when a medium or heavy touch is sensed as a difference between medium- or heavy-touch capacitance and no-touch capacitance, the sensed medium or heavy touch is smaller for touch locations farther from the center and greater for touch locations closer to the center.

Furthermore, in yet another embodiment, sense values 35 at touch locations 60 adjacent to the center tend to be closer in value to sense values 35 at touch locations 60 at the center than to sense values 35 at touch locations 60 farther from the center. Thus, the differential magnitude of sense values 35 is larger near the center and the variation in sense values 35 is smaller near the center. This can be seen, for example, in the graph in FIG. 9, where sense values 35 in touch area 62 are constant and have low variability compared to sense values 35 outside touch area 62. In graphical terms, a spatial graph of differential sense values 35 or ratios near the center is relatively flat with a smaller slope while sense values 35 or ratios farther from the center have a larger slope and change more rapidly. The greater the force detected, the greater is touch area 62 and the greater is the relative slope of sense values 35 farther from the center. This difference is readily seen by comparing FIGS. 7, 8, and 9. In FIG. 7, touch area 62 (not shown) includes a single point equivalent to touch location 60 while the slope of the curve is one (a change in sense value 35 of one for every single change in spatial location). In FIG. 8, touch area 62 includes three points and the slope of the curve outside touch area 62 is one (a change in sense value 35 of one for every single change in spatial location). In FIG. 9, touch area 62 includes five points and the slope of the curve outside touch area 62 is 1.333 (a change in sense value 35 of 4 for a change in spatial location of 3). Thus, stronger forces cause larger touch areas 62 with less variation and faster changes in sense value 35 outside touch areas 62. Therefore, heavy-touch capacitances sensed for adjacent touch locations 60 are closer to the heavy-touch capacitance sensed for the center touch location 60 than light-touch capacitances sensed for the adjacent touch location 60 are to the light-touch capacitance sensed for the center touch location 60.

This result is understood with reference to a physical deformable touch element 80, such as a finger. As deformable touch element 80 presses against a capacitive touch screen, the shape of deformable touch element 80 becomes flatter in the area touching the capacitive touch screen as the portion of deformable touch element 80 in contact with the capacitive touch screen compresses. The remaining portion of deformable touch element 80 not in contact with the capacitive touch screen tends to maintain its shape.

As part of a force calculation, touch area 62 can be calculated, for example by comparing sensed capacitance to a pre-determined threshold value for multiple adjacent touch locations. Alternatively, a ratio of sensed capacitance to the sensed no-touch capacitance is compared to a pre-determined threshold value for multiple adjacent touch locations 60. In general, using ratios tends to provide fewer false positive or false negative detections.

The present invention provides a way to detect force with a capacitive touch screen. Touch locations 60 within the capacitive touch screen can also be sensed to detect touch location 60 whose measured capacitance has the greatest difference from the sensed no-touch capacitance. The detected touch location 60 whose measured capacitance has the greatest difference from the sensed no-touch capacitance can be reported as the center point of the touching deformable touch element 80, thus providing a user of the present invention with a report of both a location and a force measurement for a capacitive touch screen. This report can be useful in a user interface or to control a processor or indicate elements in a display. Since many touch locations 60 having the sensed value 35 different from a no-touch sensed value are not necessarily located in a circle, it is also useful to report a centroid or an arithmetic or geometric mean of all of touch locations 60 in touch area 62.

Force detection using the present invention has been demonstrated with a capacitive touch screen. Since a ratio between a no-touch sensed value and a sensed value response to the deformable touch element 80 provides an improved signal-to-noise ratio, measured sense value ratios are presented for a medium-force touch and a heavy-touch force in a three-by-three array of measured and calculated sense values 35 within a larger array of touch locations 60 in a capacitive touch screen.

TABLE 2

Medium-force sensed value ratios:

|  |  |  |  |
|---|---|---|---|
| | 0.948 | 0.933 | 0.977 |
| | 0.951 | 0.877 | 0.960 |
| | 0.989 | 0.957 | 0.994 |
| Average: | 0.954 | | Average Weighted Value: 0.939 |

TABLE 3

Heavy-force sensed value ratios:

|  |  |  |  |
|---|---|---|---|
| | 0.938 | 0.915 | 0.966 |
| | 0.915 | 0.870 | 0.949 |
| | 0.989 | 0.950 | 0.993 |
| Average: | 0.943 | | Average Weighted Value: 0.926 |

The weighted average is a center-weighted average specified by weights of:

1 2 1

2 4 2

1 2 1

As is demonstrated by the measured sense value ratios of Tables 2 and 3, the center touch location 60, the average, and the weighted average values are all greater for the heavy-force sensed values 35 than for the medium-sensed values 35.

Furthermore, the variation within touch area 62 of heavy-force sensed values 35 is smaller than the variation within touch area 62 of medium-force sensed values 35:

TABLE 4

Variation of medium-force sensed value ratios:

|  |  |  |  |
|---|---|---|---|
| | 1.082 | 1.064 | 1.115 |
| | 1.085 | 1 | 1.095 |
| | 1.129 | 1.091 | 1.134 |
| Average: | 1.0995 | | |

TABLE 5

Variation of heavy-force sensed value ratios:

|  |  |  |  |
|---|---|---|---|
| | 1.076 | 1.051 | 1.120 |
| | 1.051 | 1 | 1.090 |
| | 1.137 | 1.092 | 1.141 |
| Average: | 1.0935 | | |

The variation values for Table 4 are computed by dividing each corresponding value in Table 2 by the Table 2 center value and the variation values for Table 5 are computed by dividing each corresponding value in Table 3 by the Table 3 center value. The center values are the largest differential values in the three-by-three array of ratios. The overall variation is the average of the non-center values. Other methods of calculating variation in a data set are well known in statistical mathematics and can be used in alternative embodiments of the present invention.

As described above, a relative force value can be determined by comparing sense values 35 or sense value ratios to pre-determined thresholds. Alternatively, a continuous set of force values can be determined by interpolating values between pre-determined, measured, or calibrated force limits.

Thus, a method for force detection of the deformable touch element 80 in a capacitive touch-screen device includes providing the first array of drive electrodes 30 and the second array of sense electrodes 20 in association with touch-detection area 70 and providing the touch-detection circuit 40 connected to drive electrodes 30 and connected to sense electrodes 20 for detecting capacitance at a touch location 60 in touch-detection area 70. No-touch capacitance is sensed with touch-detection circuit 40 at touch location 60 in the absence of deformable touch element 80 proximate to touch location 60 and a no-touch signal reported. Touch capacitance different from the no-touch capacitance is sensed with touch-detection circuit 40 at touch location 60 in the presence of deformable touch element 80 proximate to touch location 60. A force signal associated with the touch capacitance is produced and reported.

In an embodiment, the force signal is calculated by comparing the touch capacitance to a range of touch capacitance values. For example, as shown in Tables 2 and 3, the largest sense signal (different from the no-touch signal) is 0.87 at the heavy-touch center touch location 60. In an embodiment, this value is presumed to be the largest force that is sensed. Therefore, the forces sensed at each location relative to the largest sensed force are:

TABLE 6

Medium-force relative force values:

|  |  |  |
|---|---|---|
| 0.192 | 0.478 | 0.114 |
| 0.487 | 0.952 | 0.206 |
| 0.042 | 0.350 | 0.031 |

TABLE 7

| Heavy-force sensed value ratios: | | |
|---|---|---|
| 0.231 | 0.609 | 0.171 |
| 0.513 | 1 | 0.265 |
| 0.042 | 0.400 | 0.039 | where the values in Tables 6 and 7 are: (no-touch sensed value minus sensed value)/(no-touch sensed value minus minimum sensed value) where the minimum sensed values are sensed at the corresponding no-touch sensed value locations. Thus, the values reported in Tables 6 and 7 are linearly interpolated as a percentage within the range defined by the corresponding no-touch value and the largest sensed value. Other interpolation calculations can be used, for example using a logarithmic rather than a linear interpolation, or using alternative limits. Alternatively, the force signal can be derived from a linear or logarithmic interpolation between one and a ratio of the no-touch capacitance and a maximum touch capacitance responsive to a sensed capacitance or a value produced from the sensed capacitance.

In various embodiments, the limits between which values are interpolated can be selected to be the largest sense value difference with a no-touch sensed value in a single scan of a capacitive touch screen, or within a single touch area 62, or the largest detected in a time period, or the largest detected in a calibration step and the no-touch sense value 35 taken in a corresponding manner. Other alternative limit measurements can be used. An absolute force value can be determined by calibrating measured force values to capacitive sensed values, with or without interpolation. Measured sense values 35 can be calibrated by person, by deformable touch element 80, by use session, or by local environment, or by any combination of such attributes. The force signal can be calibrated by comparing the sensed touch capacitance to a range of sensed or calculated touch capacitance values.

Measured capacitance touch values can vary depending on a variety of factors, including electronic signal drift over time, as well as environment or usage. In consequence, it is useful to determine a baseline capacitance value in the absence of deformable touch element 80 periodically. Generally, a capacitive touch system is idle and does not detect touches most of the time. During such idle times, the capacitive touch system can gather data on each touch location 60 and refine an estimate for the no-touch capacitance at each intersection. For instance, the median of the highest 10% of the no-touch sensed signals at each touch location 60 be used as a baseline for the no-touch sensed signals at each of touch location 60. The baselines for each touch location 60 can all be different, but only by small amounts. Such averaging can reduce false measurements. If a new measurement is too different from prior baseline values for the touch location 60 or is too different from neighboring touch locations 60, the new measurement is adjusted to be the average of the neighbor's estimation of their no-touch sense values 35. Thus, a robust estimation of each no-touch sense value 35 is provided that is adaptive to environmental conditions and spatial variations intrinsic to the capacitive touch screen.

In another useful embodiment, touch-detection circuit 40 can include a memory and maintain a sense-value history at one or more touch locations 60. A force limit value can be derived from the largest sense value 35 at a touch location 60 over time or derived from the largest sense value 35 at any touch location 60 over time. The derivation can be an absolute comparison, an average or median of largest sense values 35 over time, or an adaptive largest sense value 35 obtained from sense values 35 in the recent past. Thus, a user whose applied force tends to vary over time can still indicate a large force by comparing a present force to recently sensed large sensed values. The invention can thus adapt to changes over time in both environment and usage.

Touch sensors can be turned off to reduce noise in a display-and-touch-screen system.

In an embodiment of the present invention, a capacitive touch-screen device with force detection of a deformable touch element includes the first array of drive electrodes 30 and the second array of sense electrodes 20 in association with a touch-detection area 70. The touch-detection circuit 40 is connected to drive electrodes 30 and is connected to sense electrodes 20 for detecting capacitance at a touch location 60 in touch-detection area 70. Touch-detection circuit 40 senses no-touch capacitance with touch-detection circuit 40 at touch location 60 in the absence of deformable touch element 80 proximate to touch location 60 and reports a no-touch signal. Touch-detection circuit 40 senses light-touch capacitance different from the no-touch capacitance with touch-detection circuit 40 at touch location 60 in the presence of a light-touch deformation of deformable touch element 80 proximate to touch location 60 and reports a light-touch signal. Touch-detection circuit 40 senses heavy-touch capacitance differently from both the no-touch capacitance and the light-touch capacitance with touch-detection circuit 40 at touch location 60 in the presence of a heavy-touch deformation of deformable touch element 80 proximate to touch location 60 and reports a heavy-touch signal. The array of drive electrodes 30 and sense electrodes 20 can form a corresponding array of touch locations 60 where drive electrodes 30 and sense electrodes 20 overlap. Each of touch locations 60 can be controlled by touch-detection circuit 40 through drive electrodes 30 and sense electrodes 20 to capacitance sense values 35 at corresponding touch locations 60 to detect the location and force of touches.

Touch-detection circuit 40 can include memory devices, reporting devices such as communication circuitry, and calculation circuitry. Such memories, communication circuits, and calculation circuits are known in the computer arts and can include digital logic, hardware, programmable circuits, and software programs. Touch-detection circuit 40 can include circuits for providing the area of a touch, the center or centroid of a touch, the location of a touch, the force of a touch, average, median, linearly or logarithmically interpolated values of multiple sensed capacitive values responsive to touches, or comparison and thresholding operations.

Elements of the present invention can be provided from sources known in the display, touch screen, and integrated circuit manufacturing arts.

Transparent dielectric substrates 10 with opposing parallel sides can include substrates made of, for example, glass or polymers and are known in the art. Such transparent dielectric substrate 10 can be, for example, 10 microns-1 mm thick, or more, for example 1-5 mm thick; the present invention is not limited to any particular substrate thickness. Sense and drive electrodes 20, 30 are, for example, formed on opposing sides of transparent dielectric substrate 10 using photolithographic methods known in the art, for example sputtering, patterned coating, or unpatterned coating followed by coating with photosensitive material that is subsequently patterned with light, patterned removal, and etching. Electrodes can be formed from transparent conductive materials such as transparent conductive oxides or spaced-apart micro-wires including metal. In an embodiment, transparent dielectric substrate 10 is substantially transparent, for example having a transparency of greater than 90%, 80%, 70%, or 50% in the visible range of electromagnetic radiation.

Sense and drive electrodes 20, 30 can include, for example, materials such as transparent conductive oxides, thin metal layers, or patterned metal micro-wires. Micro-wires can include cured or sintered metal particles such as nickel, tungsten, silver, gold, titanium, or tin or alloys such as nickel, tungsten, silver, gold, titanium, or tin. Materials, deposition, and patterning methods for forming electrodes on dielectric substrates are known in the art and can be employed in concert with the present invention. The physical arrangement or materials of drive and sense electrodes 30, 20 do not limit the present invention. Furthermore, the terms "drive" and "sense" electrodes are used for clarity in exposition and other terms or ways for controlling electrodes for sensing capacitance over the touch-detection area 70 are included herein.

Sense-electrode direction 22 of sense electrodes 20 or drive-electrode direction 32 of drive electrodes 30 is typically the direction of the greatest spatial extent of corresponding sense or drive electrode 20, 30 over, on, or under a side of substrate 10. Electrodes formed on or over substrates 10 are typically rectangular in shape, or formed of rectangular elements, with a length and a width, and the length is much greater than the width. See, for example, the prior-art illustrations of FIG. 10. In any case, sense-electrode direction 22 or drive-electrode direction 32 can be selected to be a direction of desired greatest extent of sense or drive electrode 20, 30 respectively. Electrodes are generally used to conduct electricity from a first point on substrate 10 to a second point and the direction of the electrode from the first point to the second point can be the length direction.

Touch-detection circuit 40 can be a digital or analog controller, for example a touch-screen controller, can include a processor, logic circuits, programmable logic arrays, one or more integrated or discrete circuits on one or more printed circuit boards, or other computational and control elements providing circuits or a memory and can include software programs or firmware. The electrical signals are, for example, electronic analog or digital signals. Signals, for example sensed capacitive signals, can be measured as analog values and converted to digital values. Signals can be, for example, current values or voltage values. Such control, storage, computational, signaling devices, circuits, and memories are known in the art and can be employed with the present invention.

Capacitors are formed where drive and sense electrodes 30, 20 overlap at touch locations 60 and store charge when energized, for example by providing a voltage differential across drive and sense electrodes 30, 20. The charge for each capacitor can be measured using sense-electrode circuits 42 in touch-detection circuit 40 and the measured capacitance value stored in a memory. By repeatedly providing a voltage differential across drive and sense electrodes 30, 20 and measuring the differential, the capacitances at touch locations 60 are repeatedly measured over time. Time-base circuits, such as clocks, are well known in the computing arts and can be employed. For example, a clock signal, as well as other control signals, is supplied to touch-detection circuit 40.

Initial baseline capacitance measurements corresponding to no-touch signals for each touch location 60 are taken, for example when a touch-screen device is manufactured or the first time the touch-screen device is powered up in the absence of any deformable touch element 80. This initial capacitance measurement provides a baseline capacitance measurement against which subsequent capacitance measurements are made to identify differences in capacitance that can indicate a touch. Maximum force capacitive measurements can also be made at such a time. Useful control methods and circuits are well known in the display and touch screen industries and can be applied. In an embodiment, capacitance measurements are taken repeatedly and can be taken periodically as controlled by a clock signal. The touch-screen device can, when no changes in capacitance are detected (i.e. no touches are detected) over a length of time, power down and cease operation until some other event occurs that causes touch detection to again measure touch location 60 capacitance.

In actual use, measured present capacitance values can be noisy and false positive or false negative touch determinations made. To avoid such false signals, in another embodiment, a ratio function indicating a touch can be limited to a range such that the ratio function can be greater than a predetermined threshold value but also less than a second predetermined threshold value that is greater than the predetermined value. Thus, the process for determining a touch includes calculating the ratio function, testing the ratio function against the predetermined threshold value, and then testing the ratio function against a second predetermined threshold value (e.g. by a comparison). Only if both tests are positive is a touch detected and a touch signal provided by the touch-detection circuit 40. Once the capacitance of the touch location 60, a ratio function calculated and touch determined, the capacitance of another touch location 60 can be tested. By requiring two comparisons within a threshold range to determine a touch, voltage spikes or false positives from other anomalous signals can be avoided.

In another embodiment of the present invention, two subsequent touch-location 60 measurements are sequentially tested and, if the measurements exceed a variation threshold, the first measurement is ignored. By requiring that a touch be detected twice sequentially, spurious, intermittent or too-short touches are ignored. A delay can be implemented within the process to require that a certain length of time, for example one millisecond, elapses before a touch signal is provided. Alternatively or in addition, more than two sequential touches are detected before a touch signal is provided.

The methods and algorithms described above can be combined, as will be appreciated by those skilled in the controller arts. For example, sequential touch detections are required separated over a desired time span to provide a touch signal and hysteresis is provided to indicate touch signal cessation.

In a further embodiment of the present invention, the transparent dielectric substrate 10 is flexible and at least one touch location 60 changes capacitance when transparent dielectric substrate 10 is flexed. In an embodiment, the change in capacitance is permanent. In an alternative embodiment, sense and drive electrodes 20, 30 are electrically conductive, transparent dielectric substrate 10 is flexible, and at least one of sense or drive electrodes 20, 30 changes its electrical conductivity when transparent dielectric substrate 10 is flexed. Such a change in conductivity can lead to performance changes in the rate at which touch location 60 capacitors are charged or discharged or the capacitance of touch location 60 capacitors. In an embodiment, the change in electrical conductivity is permanent.

The baseline capacitance values for affected touch locations 60 can also change when the capacitance of touch locations 60 or the conductivity of sense or drive electrodes 20, 30 changes. Hence, methods that rely on the absolute capacitance value of touch locations 60 can be less reliable than the ratio and adaptive methods described above.

Methods and device for forming and providing substrates 10, coating substrates 10, patterning coated substrates 10, or pattern-wise depositing materials on the substrate 10 are known in the photo-lithographic arts. Likewise, tools for laying out electrodes, conductive traces, and connectors are known in the electronics industry as are methods for manufacturing such electronic system elements. Hardware controllers for controlling touch screens and displays and software for managing display and touch screen systems are well known and can be employed with the present invention. Tools and methods of the prior art can be usefully employed to design, implement, construct, and operate the present invention. Methods, tools, and devices for operating capacitive touch screens can be used with the present invention.

A touch-screen device of the present invention can be usefully employed with display devices of the prior art. Such devices can include, for example, OLED displays and lighting, LCD displays, plasma displays, inorganic LED displays and lighting, electrophoretic displays, electrowetting displays, dimming mirrors, smart windows, transparent radio antennae, transparent heaters and other touch screen devices such as resistive touch screen devices.

The invention has been described in detail with particular reference to certain embodiments thereof, but it will be understood that variations and modifications can be effected within the spirit and scope of the invention.

PARTS LIST 5 capacitive touch-screen device
10 transparent dielectric layer, substrate
12 cover
20 sense electrode
22 sense-electrode direction
30 drive electrode
32 drive-electrode direction
35 sense value
40 touch-detection circuit
42 sense-electrode circuit
44 drive-electrode circuit
46 control circuit
48 calculation circuit
50 wire
60, 60A, 60B touch location
62 touch area
70 touch-detection area
80 deformable touch element
90 graph
100 drive electrode loop step
105 control drive electrode step
110 sense electrode loop step
115 measure sense electrode step
118 optional produce ratio step
120 store measured sense value step
125 next sense electrode loop step
130 next drive electrode loop step
135 calculate forces for stored sense values step
136 determine touch step
137 determine no-touch signal step
138 determine light-touch signal step
139 determine heavy-touch signal step
140 report calculated forces step
141 report light-touch signal step
142 report heavy-touch signal step
143 report no-touch signal step
145 report touch signal step
150 compare light-touch range step
155 compare heavy-touch range step
200 determine sense value step
210 calculate sense value ratio step
220 calculate sense value area step

The invention claimed is:

1. A capacitive touch-screen device with force detection of a deformable touch element, comprising:
    a first array of drive electrodes and a second array of sense electrodes in association with a touch-detection area on a surface of a touch screen; and
    a touch-detection circuit connected to the drive electrodes and connected to the sense electrodes for detecting capacitance at a touch location in the touch-detection area, the touch-detection circuit for:
        sensing no-touch capacitance with the touch-detection circuit at the touch location in the absence of the deformable touch element proximate to the touch location and reporting a no-touch signal;
        sensing light-touch capacitance different from the no-touch capacitance with the touch-detection circuit at the touch location in the presence of a light-touch deformation of the same deformable touch element on the surface proximate to the touch location and reporting a light-touch signal at least partially responsive to a touch area of the light-touch deformation;
        sensing heavy-touch capacitance different from both the no-touch capacitance and the light-touch capacitance with the touch-detection circuit at the touch location in the presence of a heavy-touch deformation of the same deformable touch element on the surface proximate to the touch location and reporting a heavy-touch signal at least partially responsive to a touch area of the heavy touch deformation greater than the touch area of the light-touch deformation; and
        determining a sequential progression of sensed capacitance values from no-touch to light-touch to heavy-touch indicating a sequential series of progressively more forceful touches or determining a sequential progression of sensed capacitance values from heavy-touch to light-touch to no-touch indicating a sequential series of progressively less forceful touches.

2. The capacitive touch-screen device of claim 1, wherein the drive electrodes extend across the touch-detection area in a first direction and the sense electrodes extend across the touch-detection area in a second direction different from the first direction.

3. The capacitive touch-screen device of claim 1, wherein the touch detection circuit further includes circuits for calculating a light-touch ratio between the light-touch capacitance and the no-touch capacitance and reporting a light-touch signal in response to the ratio or in response to a value produced using the ratio.

4. The capacitive touch-screen device of claim 1, wherein the touch detection circuit further includes circuits for calculating a heavy-touch ratio between the heavy-touch capacitance and the no-touch capacitance and reporting a heavy-touch signal in response to the ratio or in response to a value produced using the ratio.

5. The capacitive touch-screen device of claim 1, wherein the touch detection circuit further includes circuits for calculating a light-touch ratio between the light-touch capacitance and the no-touch capacitance, calculating a heavy-touch ratio between the heavy-touch capacitance and the no-touch capacitance, and wherein the light-touch ratio is closer to one than the heavy-touch ratio.

6. The capacitive touch-screen device of claim 1, wherein the touch detection circuit further includes circuits for reporting the touch location.

7. The capacitive touch-screen device of claim 1, wherein the deformable touch element is a finger.

8. The capacitive touch-screen device of claim 1, wherein the average distance between the deformable touch element and the drive or sense electrodes is smaller for a heavy-touch deformation than for a light-touch deformation.

9. The capacitive touch-screen device of claim 1, wherein the touch detection circuit further includes circuits for repeatedly sensing the no-touch capacitance, the light-touch capacitance, or the heavy-touch capacitance over time.

10. A capacitive touch-screen device for force detection of a deformable touch element with a capacitive touch-screen device, comprising:
    a first array of drive electrodes and a second array of sense electrodes in association with a touch-detection area on a surface of a touch screen; and
    a touch-detection circuit connected to the drive electrodes and connected to the sense electrodes for detecting capacitance at multiple touch locations in the touch-detection area, the touch-detection circuit for;
    sensing no-touch capacitance with the touch-detection circuit at the multiple touch locations in the absence of the deformable touch element proximate to the multiple touch locations and reporting a no-touch signal;
    sensing light-touch capacitance different from the no-touch capacitance with the touch-detection circuit at the multiple touch locations in the presence of a light-touch deformation of the same deformable touch element on the surface proximate to the multiple touch locations and reporting a light-touch signal at least partially responsive to a touch area of the light-touch deformation;
    sensing heavy-touch capacitance different from both the no-touch capacitance and the light-touch capacitance with the touch-detection circuit at the multiple touch locations in the presence of a heavy-touch deformation of the same deformable touch element on the surface proximate to the multiple touch locations and reporting a heavy-touch signal at least partially responsive to a touch area of the heavy-touch deformation greater than the touch area of the light-touch deformation; and
    determining a sequential progression of sensed capacitance values from no-touch to light-touch to heavy-touch indicating a sequential series of progressively more forceful touches or determining a sequential progression of sensed capacitance values from heavy-touch to light-touch to no-touch indicating a sequential series of progressively less forceful touches.

11. The capacitive touch-screen device of claim 10, wherein the touch-detection circuit further includes circuits for reporting a heavy-touch signal at a first number of touch locations, reporting a light-touch signal at a second number of touch locations, and wherein the first number is greater than the second number.

12. The method of claim 10, wherein each of the touch locations reporting a heavy touch or reporting a light touch is adjacent to another touch location reporting a heavy touch or reporting a light touch.

13. The method of claim 12, wherein the touch locations reporting a heavy touch or reporting a light touch form a substantially circular or oval perimeter.

14. The capacitive touch-screen device of claim 10, wherein the deformable touch element has a center and wherein the difference between the light-touch capacitance and the no-touch capacitance sensed for touch locations farther from the center is smaller than the difference between the light-touch capacitance and the no-touch capacitance sensed for touch locations closer to the center.

15. The capacitive touch-screen device of claim 10, wherein the deformable touch element has a center and wherein the difference between the heavy-touch capacitance and the no-touch capacitance sensed for touch locations farther from the center is smaller than the difference between the heavy-touch capacitance and the no-touch capacitance sensed for touch locations closer to the center.

16. The capacitive touch-screen device of claim 10 wherein:
    the deformable touch element has a center located nearest a center touch location and adjacent touch locations are located adjacent the center touch location; and
    wherein the heavy-touch capacitance sensed for the adjacent touch locations are closer to the heavy-touch capacitance sensed for the center touch location than the light-touch capacitance sensed for the adjacent touch location are to the light-touch capacitance sensed for the center touch location.

17. The capacitive touch-screen device of claim 10, wherein the touch-detection circuit further includes circuits for reporting a touch location at the touch location whose measured capacitance has the greatest difference from the sensed no-touch capacitance.

18. The capacitive touch-screen device of claim 10, wherein the touch-detection circuit further includes circuits for producing the touch area by comparing sensed capacitance to a pre-determined threshold value or by comparing a ratio of sensed capacitance to the sensed no-touch capacitance to a pre-determined threshold value for multiple adjacent touch locations.

19. The capacitive touch-screen device of claim 10, wherein the touch-detection circuit further includes circuits for reporting a touch force responsive to the area of the calculated touch area.

20. The capacitive touch-screen device of claim 10, wherein the touch-detection circuit further includes circuits for reporting a touch location at the center or centroid of the touch area.

21. A capacitive touch-screen device for force detection of a deformable touch element in a capacitive touch-screen device, comprising:
    a first array of drive electrodes and a second array of sense electrodes in association with a touch-detection area on a surface of a touch screen, and;
    a touch-detection circuit connected to the drive electrodes and connected to the sense electrodes for detecting capacitance at a touch location in the touch-detection area, the touch-detection circuit for:
    sensing a no-touch capacitance with the touch-detection circuit at the touch location in the absence of a deformable touch element proximate to the touch location and reporting a no-touch signal;
    sensing a touch capacitance different from the no-touch capacitance with the touch-detection circuit at the touch location in the presence of the same deformable touch element on the surface proximate to the touch location at least partially responsive to a touch area of the deformable touch element on the surface;
    determining a sequential progression of sensed capacitance values from no-touch to light-touch to heavy-touch indicating a sequential series of progressively more forceful touches or determining a sequential progression of sensed capacitance values from heavy-touch to light-touch to no-touch indicating a sequential series of progressively less forceful touches;

producing a force signal associated with the touch capacitance; and reporting the force signal.

22. The capacitive touch-screen device of claim 21, wherein the touch-detection circuit further includes circuits for calculating the force signal by comparing the touch capacitance to a range of touch capacitance values.

23. The capacitive touch-screen device of claim 21, wherein the touch-detection circuit further includes circuits for calibrating the force signal by comparing the touch capacitance to a range of touch capacitance values.

24. The capacitive touch-screen device of claim 21, wherein the touch-detection circuit further includes circuits for producing the force signal from a linear or logarithmic interpolation between the no-touch capacitance and a maximum touch capacitance responsive to a sensed capacitance or a value produced from the sensed capacitance.

25. The capacitive touch-screen device of claim 21, wherein the touch-detection circuit further includes circuits for producing the force signal from a linear or logarithmic interpolation between one and a ratio of the no-touch capacitance and a maximum touch capacitance responsive to a sensed capacitance or a value produced from the sensed capacitance.

* * * * *